March 15, 1966 W. B. JEFFREY 3,240,535
FLUID PRESSURE BRAKE CONTROL APPARATUS
Filed April 29, 1964 3 Sheets-Sheet 1

INVENTOR.
William B. Jeffrey
BY
A. A. Steinmiller
Attorney

INVENTOR.
William B. Jeffrey
BY
A.A. Steinmiller
Attorney

March 15, 1966 W. B. JEFFREY 3,240,535
FLUID PRESSURE BRAKE CONTROL APPARATUS
Filed April 29, 1964 3 Sheets-Sheet 3

INVENTOR.
William B. Jeffrey
BY
Attorney

United States Patent Office 3,240,535
Patented Mar. 15, 1966

3,240,535
FLUID PRESSURE BRAKE CONTROL
APPARATUS
William B. Jeffrey, Irwin, Pa., assignor to Westinghouse
Air Brake Company, Wilmerding, Pa., a corporation of
Pennsylvania
Filed Apr. 29, 1964, Ser. No. 363,533
4 Claims. (Cl. 303—15)

This invention relates to brake control apparatus for railway vehicles, and more particularly to a combined electro-pneumatic and automatic-pneumatic brake control apparatus for controlling brakes on a railway locomotive and a train of coupled cars on the electro-pneumatic straight-air principle according to energization and deenergization of application and release train wires, or on the automatic-pneumatic principle according to the extent of reduction in pressure of fluid in a brake pipe on the train in the event of a short circuit or malfunction of the train wires from any cause.

Certain railroads in the United States have now in use on their properties various existing types of combined electro-pneumatic straight-air and automatic-pneumatic brake equipments, such as those using the well-known D-22 type or U type of control valve device.

In the copending application Serial No. 291,570, of William B. Jeffrey, filed June 28, 1963, and assigned to the assignee of the present application, there is shown and described a combined electro-pneumatic and automatic-pneumatic brake control apparatus for a railway locomotive or self-propelled passenger car that will operate compatibly in a mixed train wherein certain of the cars are provided with a brake equipment including either a D-22 type or U type of control valve device.

The dual type of brake control system disclosed in the above-mentioned copending application comprises an electro-pneumatic brake apparatus and an automatic-pneumatic brake apparatus so constructed and coordinated that, upon failure of the electro-pneumatic brake apparatus to effect a brake application on all the cars in a mixed train, the automatic-pneumatic brake apparatus will function automatically to effect a brake application on all the cars in the mixed train without the necessity for the engineer to operate any change-over mechanism or perform any act whatsoever. This dual type of brake control system comprises an electro-pneumatic straight-air brake apparatus embodying a magnet valve device operated through train wires by a pneumatically operated master controller, the operation of which is effected by manual operation of an engineer's brake valve device, and an automatic-pneumatic brake apparatus embodying a fluid pressure operated brake control valve device that is also operated either by manual operation of the engineer's brake valve device or by an emergency rate of reduction of pressure in a train brake pipe extending from car to car through the train as the result of a burst hose between any two adjacent cars in the train or by manual operation of an emergency conductor's valve located on each car in the train.

As described in detail in the above-mentioned copending application, operation of the magnet valve device in this dual type brake control system is effective to cause the supply of fluid under pressure from a control reservoir associated with the above-mentioned fluid pressure operated brake control valve device to a relay valve device, the operation of which effects the supply of fluid under pressure to brake cylinder devices to cause a brake application on the vehicle. The resulting reduction of control reservoir pressure active in a chamber at one side of a movable abutment in the brake control valve device is accompanied by a simultaneous reduction of brake pipe pressure active in a chamber at the opposite side of the movable abutment in response to manual operation of the engineer's brake valve device to effect a corresponding reduction in pressure in a brake pipe, thereby rendering the brake control valve device inoperative. Therefore, should the magnet valve device for any reason become inoperative to effect a reduction of the pressure in the control reservoir, brake pipe pressure is correspondingly reduced by manual operation of the engineer's brake valve device, whereupon the higher pressure remaining in the control reservoir effects an immediate automatic operation of the brake control valve device to cause a pneumatic brake application independently of and without the necessity of any action by the engineer.

Furthermore, the electro-pneumatic straight-air brake apparatus of the dual type brake control system, described in the above-mentioned copending application, comprises a fluid pressure operated valve device through which, in the absence of the supply of fluid under pressure thereto, a volume reservoir is charged from the main reservoir on the locomotive to the pressure carried in this main reservoir. This electro-pneumatic straight-air brake apparatus also embodies an emergency magnet valve device that is operated through wires upon manual operation of the engineer's brake valve device to an emergency position to cause the supply of fluid under pressure from the brake pipe to the above-mentioned fluid pressure operated valve device to cause this valve device to operate to close the communication between the main reservoir and the volume reservoir and establish a communication between the volume reservoir and a quick action chamber within the fluid pressure operated brake control valve device of the automatic-pneumatic brake apparatus comprising a part of the dual type locomotive brake control system. This fluid pressure operated brake control valve device comprises a pipe bracket to which is secured a service portion and an emergency portion. The emergency portion comprises a diaphragm having at one side a chamber that is open to the brake pipe and having at the opposite side a chamber that is connected to the quick action chamber. Therefore, the fluid at main reservoir pressure supplied from the volume reservoir to the quick action chamber flows therefrom to the chamber at the opposite side of the diaphragm of the emergency portion and, since main reservoir pressure is normally higher than brake pipe pressure, deflects the diaphragm against the yielding resistance of a spring in a direction to operate a coaxially arranged vent valve to an unseated position, whereupon brake pipe pressure active in the chamber at the one side of the diaphragm is vented to atmosphere at an emergency rate to cause the brake control valve devices on the locomotive and the cars in the train to operate in response to this emergency rate of brake pipe pressure reduction to effect an emergency brake application on the locomotive and the respective cars in the train.

The main reservoir or reservoirs on most modern locomotives today are charged with fluid under pressure by a continuously driven fluid compressor that is provided with an unloading device that operates to unload the compressor upon the pressure in the main reservoir reaching a certain chosen value, and to then load or reload the compressor upon the pressure in the main reservoir being reduced to a certain lower chosen value as the result of the use of fluid under pressure from the main reservoir for effecting the charging of the brake equipment on a train or the recharging and release of the brakes subsequent to a brake application.

It has been found in actual practice that prior to the time the fluid compressor on the locomotive is reloaded to recharge the main reservoir, the pressure in the main reservoir, and therefore in the above-mentioned volume reservoir, may be very little higher than the pressure in the brake pipe. In some instances in actual practice, it has been found that prior to reloading the fluid compressor, the pressure in the main reservoir, and therefore in the volume reservoir, did not exceed the pressure in the brake pipe by more than five pounds per square inch. Consequently, should it become imperative to effect an emergency brake application while the pressure in the volume reservoir did not exceed the pressure in the brake pipe by more than, for example, five pounds per square inch, the supply of this fluid under pressure from the volume reservoir to the quick action chamber and thence to the above-mentioned chamber at the opposite side of the diaphragm of the emergency portion of the brake control valve device would not establish a sufficient differential of pressure on this diaphragm to deflect it against the yielding resistance of the spring and unseat the vent valve to cause an emergency rate of reduction of the pressure in the brake pipe. Therefore, an emergency brake application on the locomotive and the cars coupled thereto would fail to occur at a time that an emergency brake application on the train is most desired to avoid serious damage or injury to personnel.

Accordingly, it is the general object of this invention to provide an improved and more positive acting combined electro-pneumatic and automatic-pneumatic brake control apparatus for a railway locomotive or self-propelled passenger car wherein an electro-pneumatic emergency brake application can be effected at any time irrespective of the prevailing pressure in the main reservoir on the locomotive or self-propelled passenger car, this brake control apparatus also being so constructed and coordinated that, upon failure of the electro-pneumatic brake apparatus to effect a brake application on all the cars in a mixed train of cars provided with either a D-22 type or U type of control valve device, the automatic-pneumatic brake apparatus will function automatically to effect a brake application on all the cars in the mixed train without the necessity for the engineer to operate any change-over mechanism or perform any act whatsoever.

The electro-pneumatic straight-air brake apparatus of the dual type brake control system of the present invention comprises a fluid pressure brake control valve device embodying a pipe bracket having two opposite bolting faces to which are respectively secured a service portion and an emergency portion, the latter comprising a vent valve device operated by a diaphragm having at one side a chamber that is open to the brake pipe, and having at the opposite side a chamber that is connected to a quick action chamber formed in the brake control valve device, a fluid pressure operated valve device operable to effect venting of fluid under pressure from the brake pipe and active in the chamber at the one side of the diaphragm to atmosphere to cause the emergency portion to operate to reduce the pressure in the brake pipe at an emergency rate, thereby effecting an automatic-pneumatic emergency brake application on the train, and an emergency magnet valve device. This emergency magnet valve device is constructed and operated substantially as described in the above-mentioned copending application for effecting the supply of fluid under pressure from the brake pipe to the fluid pressure operated valve device to cause the operation thereof.

Except as pointed out above, the electro-pneumatic straight-air brake apparatus of the dual type brake control system comprising the present invention embodies all of the apparatus shown and described in the above-mentioned copending patent application, which apparatus operates with minor exceptions in substantially the same manner as described therein.

In the accompanying drawings:

FIG. 1 constitutes a diagrammatic view of an improved electro-pneumatic emergency brake control apparatus embodying the present invention.

DESCRIPTION

Figure 1:
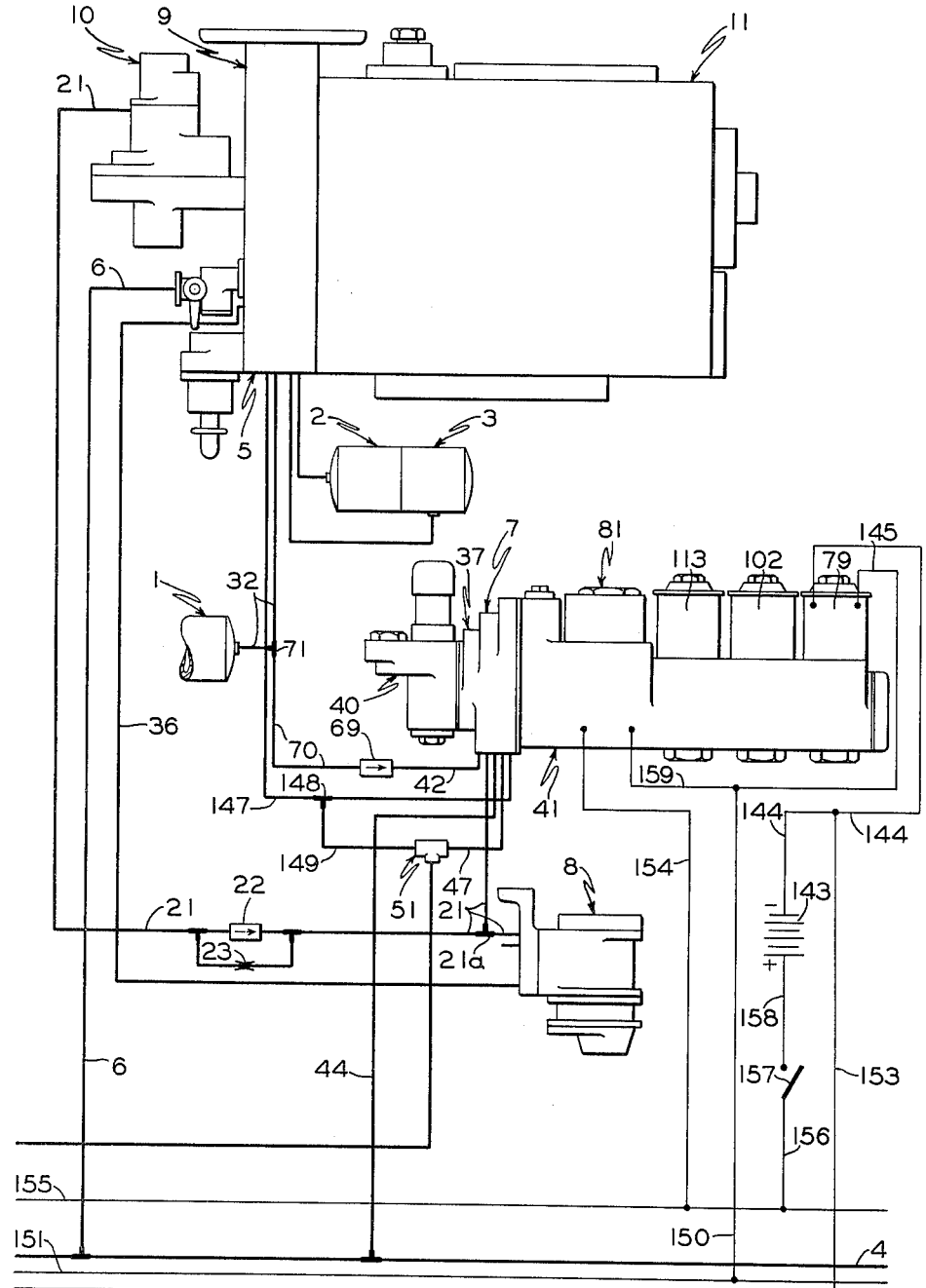

The present invention relates to improvements in an electro-pneumatic emergency brake control apparatus which may be used in a combined electro-pneumatic and automatic-pneumatic brake apparatus of the type shown and described in the copending application Serial No. 291,570, of William B. Jeffrey, filed June 28, 1963, and assigned to the assignee of the present application. Referring to FIG. 1 of the drawings, which shows an improved electro-pneumatic emergency brake control apparatus that embodies the present invention for use in the above-mentioned combined electro-pneumatic and automatic-pneumatic brake apparatus, it will be seen that this improved electro-pneumatic emergency brake control apparatus comprises an auxiliary reservoir 1, a control reservoir 2 which is combined with a selector volume reservoir 3 into a two-compartment reservoir, a brake pipe 4 that extends from end to end of a locomotive or self-propelled passenger car, a fluid pressure brake control valve device 5 that is connected by a branch pipe 6 to the brake pipe 4, a magnet valve device 7 and a pilot emergency vent valve device 8.

Figure 2:
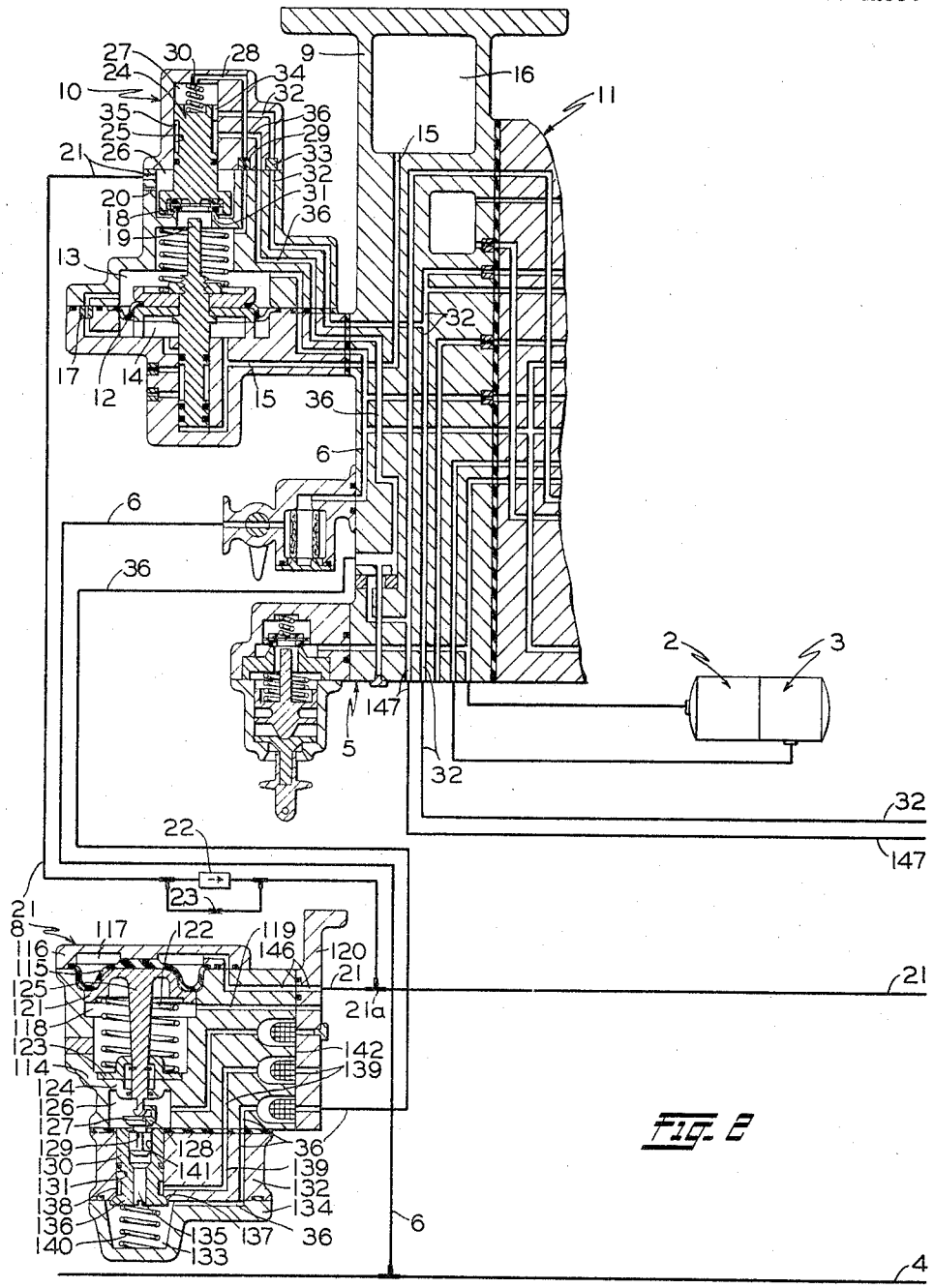
FIG. 2 is a cross-sectional view of a portion of the brake control valve device and the entire fluid pressure operated valve device shown in FIG. 1.

A portion of the fluid pressure brake control valve device 5 is shown diagrammatically in FIG. 2 of the drawings. It should be understood that the remainder of the fluid pressure brake control valve device 5 is substantially identical in construction to the fluid pressure brake control valve device shown and described in United States Patent No. 3,018,138, issued January 23, 1962, to Richard L. Wilson and William B. Jeffrey, and assigned to the assignee of the present application, it being understood that a full description of the details of the portion of the fluid pressure brake control valve device 5 (not shown) is not necessary to an understanding of the present invention.

A partial diagrammatic view showing a pipe bracket 9, to the left-hand side of which is secured an emergency portion 10 of the fluid pressure brake control valve device 5, is shown in FIG. 2 of the drawings. This brake control valve device 5 may be of the graduated release type, such as that disclosed in the above-mentioned United States Patent No. 3,018,138, except the emergency portion 10 is modified as hereinafter explained in detail. In view of this, it is deemed unnecessary to show and describe the brake control valve device in detail. Briefly, however, the brake control valve device 5 comprises, as shown in FIG. 1, the pipe bracket 9, to the left-hand side of which is secured the emergency portion 10, and to the right-hand side of which is secured a service portion 11.

Briefly, the emergency portion 10, shown in FIG. 2, comprises a diaphragm 12 having at one side a chamber 13 that is open to the brake pipe branch pipe 6 and having at the opposite side a chamber 14 that is connected via a passageway 15 to a quick action chamber 16 in the pipe bracket 9, which chamber is charged from the chamber 13 via a quick action chamber charging choke 17.

Arranged coaxially with the diaphragm 12 is a preferably disc-shaped brake pipe vent valve 18 which is adapted to be unseated by a stem 19 operatively connected to the diaphragm 12 upon an emergency rate of reduction in brake pipe pressure present in the chamber 13 above the diaphragm 12, whereupon the fluid under pressure active in the chamber 13 is vented at a rapid rate to atmosphere via a choke 20 and to a passageway and corresponding pipe 21 which is connected to the pilot emergency valve device 8 and the magnet valve device 7 via a check valve device 22 having a choke 23 connected in bypassing relation thereto. This rapid rate of venting of fluid under pressure from the brake pipe 4 and active in the chamber above the diaphragm 12 acts to hasten the propagation of an emergency rate of reduction in brake pipe pressure from car to car through the train.

The brake pipe vent valve 18 abuts a cylindrical high pressure valve 24 that has sealing, slidable contact with the wall of a bore 25 that is open at its lower end to a chamber 26 connected to atmosphere via the choke 20 and that is open at its opposite end to a chamber 27 having a restricted communication with the chamber 13 via a passageway 28 that has a choke 29 disposed therein, the size of which is less than that of the choke 17. A helical biasing spring 30 disposed in chamber 27 urges the high pressure valve 24 to a normal position, in which it is shown in FIG. 2, and in which the valve 24, through abutting contact with the brake pipe vent valve 18, operatively holds the latter seated against an annular valve seat 31. With the brake pipe vent valve 18 seated, fluid flow from the brake pipe chamber 13 to the chamber 26 is prevented.

It will be noted that the emergency portion 10 of the fluid pressure brake control valve device 5 of the present invention differs from the emergency portion, shown and described in the above-mentioned Patent No. 3,018,138, in that a passageway 32 in the emergency portion 10 that is connected at one end by a pipe bearing the same numeral to the auxiliary reservoir 1 and is open at the opposite end at the wall surface of the bore 25 has disposed therein a plug or closure member 33. It will be further noted that the upper end of the cylindrical high pressure valve 24 is provided with a fluted portion 34 that always provides a communication between the chamber 27 and a peripheral annular groove 35 formed on the high pressure valve 24 intermediate the ends thereof. A passageway 36 formed in the body of emergency portion 10 opens at one end at the wall surface of the bore 25 intermediate the ends of the peripheral annular groove 35. This passageway 36 extends through the emergency portion 10 and pipe bracket 9 and is connected by a corresponding pipe bearing the same numeral to the pilot emergency vent valve device 8, in a manner hereinafter described in detail.

The service portion 11 of the fluid pressure brake control valve device 5 is constructed substantially as shown in the above-mentioned Patent No. 3,018,138 and, briefly, comprises a diaphragm stack including two movable abutments or diaphragms of unequal area. The larger diaphragm is subject at its lower side to the pressure in the control reservoir 2 and at its upper side to the pressure in the brake pipe 4. The smaller diaphragm is subject at its lower side to atmospheric pressure and at its upper side to a pressure that corresponds to the pressure in a brake cylinder device (not shown), as explained in the hereinbefore-mentioned Patent No. 3,018,138. The service portion 11 operates in the same manner as described for the service portion of the brake control valve device shown in this patent.

Figure 3:
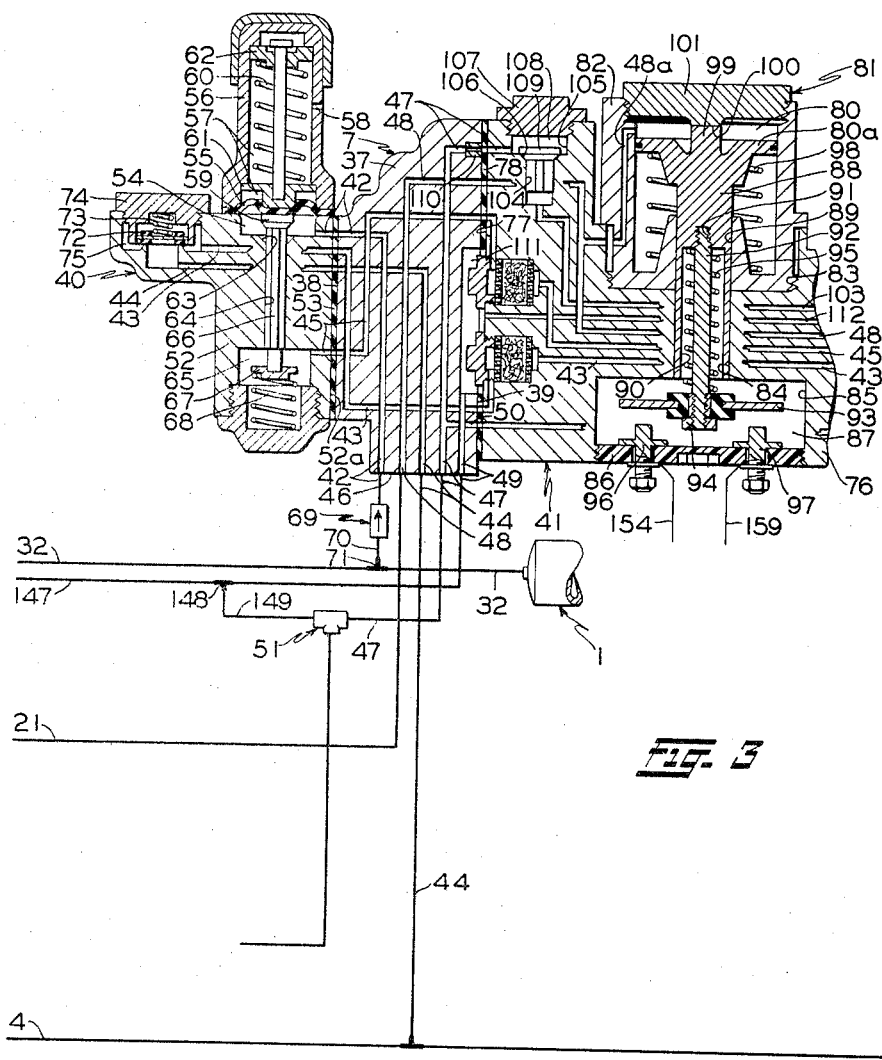
FIG. 3 is a cross-sectional view of the magnet valve device shown in FIG. 1.

A portion of the magnet valve device 7 is shown diagrammatically in FIG. 3 of the drawings. It should be understood that the remainder of the magnet valve device 7 is identical in construction to the magnet valve device 13, shown and described in the above-mentioned copending application, it being understood that a full description of the details of that portion of the magnet valve device 7 that is not shown in FIG. 3 is not necessary to an understanding of the present invention.

That portion of the magnet valve device 7, that is shown diagrammatically in FIG. 3 of the drawings, comprises a pipe bracket 37 that is provided on opposite sides, respectively, with vertical bolting faces 38 and 39 to which are secured, respectively, by any suitable means (not shown), a cut-off valve device 40 and a magnet valve mechanism 41, only a portion of which is shown in FIG. 3, it being understood that the remainder of the magnet valve mechanism 41 is identical in construction to the magnet valve mechanism identified by the numeral 107 in the hereinbefore-mentioned copending application.

Extending from the vertical bolting face 38 through the pipe bracket 37 are four ports and passageways 42, 43, 44 and 45. The passageways 42 and 44 open at a flat surface 46 formed on the lower side of the pipe bracket 37, and the passageways 43 and 45 open at the surface of the vertical bolting face 39 on the right-hand side of the pipe bracket. Also opening at the surface of the vertical bolting face 39 and extending therefrom through the pipe bracket 37 and opening at the flat surface 46 on the lower side of the pipe bracket are three other ports and passageways 47, 48 and 49. A port 50 opens at the surface of the vertical bolting face 39 and is connected by a corresponding passageway in the pipe bracket 37 to the passageway 47 in the pipe bracket, which passageway 47 is connected by a pipe bearing the same numeral to the right-hand end of a double check valve device 51, as shown in FIGS. 1 and 3 of the drawings.

The end of the passageway 49 that opens at the vertical bolting face 39 is enlarged, as shown in FIG. 3 of the drawings, to receive the ends of two pipe plugs carried by the magnet valve mechanism 41 hereinafter described.

The cut-off valve device 40 of the magnet valve device 6 comprises a body 52 that is provided on one side thereof with a vertical bolting face 52a that corresponds to the bolting face 38 of the pipe bracket 27, in that opening at the surface of the bolting face 52a are the same number of ports as open at the surface of the bolting face 38, these ports being identically arranged therein and opening from corresponding passageways in the body 52 so that when a gasket 53, provided with ports therein corresponding in number and arrangement to the ports opening at the respective surfaces of bolting faces 38 and 52a, is placed between these two bolting faces, and the body 52 is rigidly secured to the pipe bracket 37 by bolts or other suitable means (not shown), the passageways 42, 43, 44 and 45 in the pipe bracket 37 extend into corresponding passageways in the body 52.

The passageway 42 extends through the body 52 to a chamber 54 formed in the body at the lower side of a diaphragm 55 which is rigidly clamped around its periphery between the body 52 and a hollow cylindrical cover 56 which is secured to the body 52 by any suitable means (not shown). The diaphragm 55 and cover 56 cooperate to form at the upper side of the diaphragm a chamber 57 that is open to atmosphere through a port 58 formed in the cover 56. The diaphragm 55 is operatively connected to a poppet type cut off valve 59, as will now be described.

A spring 60, disposed in the chamber 57 and interposed between a first follower 61 having contact with the upper side of the diaphragm 55 and a second follower 62 slidably mounted in the hollow cylindrical cover 56, biases the cut-off valve 59 towards a lower position against an annular valve seat 63 formed at the upper end of a bore 64 extending from the chamber 54 through the body 52 to a chamber 65 also in the body 52. The cut-off valve 59 has a fluted stem 66 integral therewith that extends through the bore 64 into the chamber 65 into which opens the hereinbefore-mentioned passageway 45. Disposed in the chamber 65 and in contact with the lower end of the fluted stem 66 is a spring seat 67 between which and the bottom of the chamber 65 is interposed a spring 68 which is effective to bias the fluted stem 66 and cut-off valve 59 upward against the bottom of the diaphragm 55. The strength of the spring 60 is substantially greater than the strength of the spring 68 so that the spring 68 is effective to unseat the cut-off valve 59 from its seat 63 only when the fluid under pressure in the chamber 54 exceeds a chosen value which is sufficient to deflect the diaphragm 55 upward against the yielding resistance of the heavy spring 60. The passageway 42 extending from the chamber 54 through the body 52 and pipe bracket 37 is connected by a pipe bearing the same numeral, as shown in FIG. 3, to the outlet end of a check valve device 69.

The inlet end of the check valve device 69 is connected to one end of a pipe 70 that has its opposite end, as shown in FIG. 3, connected to the side outlet of a pipe T 71. The pipe T 71 is disposed in the hereinbefore-mentioned pipe 32 that connects the corresponding passageway in the emergency portion 10 of the fluid pressure brake control valve device 5 to the auxiliary reservoir 1. Therefore, upon the pressure in the auxiliary reservoir 1 and chamber 54 being reduced below the above-mentioned chosen value as the result of leakage or any other cause, the heavy spring 60 will effect seating of the cut-off valve 59 on its corresponding annular valve seat 63 to retain sufficient pressure in the auxiliary reservoir 1 to effect an automatic-pneumatic brake application.

One end of the passageway 44 in the body 52 of the cut-off valve device 40 is connected by a corresponding pipe bearing the same numeral to the brake pipe 4, and the opposite end opens at the lower side of a preferably disc-shaped check valve 72 that is normally biased to a seated position by a spring 73. The spring 73 is disposed between the check valve 72 and a screw-threaded plug 74 having screw-threaded engagement with the body 52. The plug 74 cooperates with the body 52 to form a chamber 75 into which opens the passageway 43 in the body 52.

The magnet valve mechanism 41 of the magnet valve device 7 comprises a body 76 which, like the body 52, is provided on one side thereof with a vertical bolting face 77 that corresponds to the bolting face 39 of the pipe bracket 37, in that opening at the surface of the bolting face 77 are the same number of ports as open at the surface of the bolting face 39, these ports being identically arranged therein and opening from passageways in the body 76. Therefore, when a gasket 78, which is provided with ports therein corresponding in number and arrangement to the ports opening at the respective surfaces of bolting faces 39 and 77, is placed between these two bolting faces, and the body 76 is rigidly secured to the pipe bracket 37 by bolts or other suitable means (not shown), the hereinbefore-mentioned passageways 43, 45, 47, 48 and 50 in the pipe bracket extend into the body 76.

The passageway 43 extends through the body 76 to a supply chamber (not shown) of a solenoid-operated emergency magnet valve device 79, shown in FIG. 1 of the drawings. The solenoid-operated emergency magnet valve device 79 is also provided with a delivery chamber (not shown) into which opens the hereinbefore-mentioned passageway 48 that extends through the body 76 and pipe bracket 37. This passageway 48 is connected by a branch of the hereinbefore-mentioned pipe 21 to the side outlet of a pipe T 21a disposed in the pipe 21, as shown in FIG. 1.

A branch 48a of the passageway 48 in the body 76 leads to a chamber 80 above a switch piston 80a of an emergency-pneumatic switch device 81, shown in FIGS. 1 and 3, that constitutes a part of the magnet valve mechanism 41.

The emergency-pneumatic switch device 81 comprises, as shown in FIG. 3, in addition to the switch piston 80a, a cup-shaped switch cylinder 82 in which the switch piston 80a is slidably mounted. The switch cylinder 82 is provided at one end with external screw threads which have screw-threaded engagement with corresponding internal screw threads formed on the wall of a counterbore 83 that is coaxial with a bore 84 extending from the end of the counterbore 83, through the body 76, and opening into a second coaxial counterbore 85 therein, the open end of which is provided with internal screw threads for receiving a screw-threaded plug 86 constructed of a suitable insulating material which, in cooperation with the wall and bottom of the counterbore 85, forms a switch chamber 87.

The switch piston 80a has formed integral therewith a piston rod 88 that is slidably mounted in the bore 84 in the body 76 and a coaxial bore 89 extending through the closed end of the cup-shaped switch cylinder 82.

The piston rod 88 is provided with a counterbore 90 and a coaxial bottom bore 91 that is screw threaded internally to receive a screw-threaded end of a rod 92, the opposite free end of which is disposed in the switch chamber 87. This free end of the rod 92 extends through an aperture in an insulating bushing molded integral with a movable contact 93 and carries a nut 94 against which the insulating bushing of the contact 93 is biased by a contact spring 95 that is disposed in surrounding relation to the rod 92 and interposed between the bushing of the contact 93 and a shoulder formed by the upper end of the counterbore 90 in the piston rod 88.

The movable contact 93 is normally biased out of contact with two spaced-apart and insulated switch terminals 96 and 97 by a spring 98 that is disposed in surrounding relation to the piston rod 88 and interposed between the closed end of the switch cylinder 82 and the switch piston 80a. In this position of the switch piston 80a, a boss 99 formed on the upper face thereof is biased against a stop 100 that is formed on a screw-threaded plug 101 that has screw-threaded engagement with internal screw threads formed in the open end of the cup-shaped switch cylinder 82.

The hereinbefore-mentioned passageway 45 extends through the body 76 to a supply chamber (not shown) of a solenoid-operated service magnet valve device 102, shown in FIG. 1 of the drawings. The service magnet valve device 102 is provided with a delivery chamber (not shown) into which opens one end of a passageway 103 formed in the body 76 of the magnet valve mechanism 41.

The passageway 103 extends through the body 76 and opens into the bottom of a counterbore 104 formed in the body 76. The counterbore 104 is coaxial with another counterbore 105 of larger diameter in the body 76 and has an annular valve seat 106 formed at its junction with the counterbore 105. The upper end of the counterbore 105 is screw threaded to receive a screw-threaded plug 107 that cooperates with the wall of the counterbore 105 to form a chamber 108 in which is disposed a poppet type check valve 109 having a fluted stem integral therewith and extending into the counterbore 104. The check valve 109 provides for flow of fluid under pressure from the delivery chamber of the service magnet valve device 102 via the passageway 103 to the chamber 108 and its operative to prevent back flow from the chamber 108 to the delivery chamber of the service magnet valve device 102.

The passageway 47 extends through the body 76 and opens into the chamber 108, and that end of the passageway 47 in the pipe bracket 37 that opens at the surface of the bolting face 39 thereon is provided with a service choke 110 that controls or restricts the rate at which fluid under pressure can be supplied by the service magnet valve device 102 for effecting a service brake application in a manner not necessary to an understanding of the present invention, and, therefore, will not be described in detail herein.

The passageway 49 in the pipe bracket 37 opens at one end into a chamber 111 formed between the pipe bracket 37 and the body 76. Opening into the chamber 111 is one end of a passageway 112 that extends through the body 76, and opens at its other end into a chamber (not shown) of a solenoid-operated release magnet valve device 113, shown in FIG. 1 of the drawings. The release magnet valve device 113 is provided with a second chamber (not shown) into which opens one end of the passageway 50, the other end of which, as shown in FIG. 3 of the drawings, is joined to the passageway 47 in the pipe bracket 37.

The pilot emergency vent valve device 8 is shown diagrammatically in FIG. 2 of the drawings, and comprises a casing section 114 containing a diaphragm 115 clamped about its periphery between the casing section 114 and a cover 116, and defining with the cover a control chamber 117. At the other side of the diaphragm 115 is a spring chamber 118 which is open to atmosphere through a passageway 119 that extends through the casing section 114 and a pipe bracket 120 to which the casing section 114 is secured by any suitable means, such as, for example, cap screws (not shown). Contained in the chamber 118 is a diaphragm follower 121 which is biased into operative contact with the diaphragm 115 by a spring 122 interposed between the follower 121 and a hollow spring seat 123 that rests against a partition wall 124 of the chamber 118. Follower 121 has a stem 125 that extends through the hollow spring seat 123 and a central opening in the partition wall 124.

A chamber 126 is formed in the casing section 114 at the side of the partition wall 124 opposite the chamber 118 and contains a valve 127 that is linked by means of a forked connection 128 to the lower end of the stem 125, as viewed in FIG. 2 of the drawings. The valve 127 is adapted to make seating contact with a valve seat 129 formed on the upper end of a cylindrical valve member 130 which is slidably mounted in a bore 131 formed in a casing section 132 which is secured to the casing section 114 by any suitable means (not shown). The bore 131 in casing section 132 extends from the chamber 126 to a chamber 133 formed in another casing section 134 secured to the casing section 132 by any suitable means (not shown).

The valve member 130 is provided with a through bore 135. The lower end of the cylindrical valve member 130 is encircled by a conical or poppet type valve 136, which is arranged for cooperation with an annular valve seat 137 formed on the casing section 132 at the lower end of bore 131, to control communication between chamber 133 and a chamber 138 defined by the wall of the bore 131 and a reduced portion of the valve member 130, which chamber 138 is open to atmosphere via a passageway 139 extending through the casing sections 132 and 114, and the pipe bracket 120. A spring 140 is disposed in chamber 133 and is interposed between the valve 136 and the casing section 134 for urging the valve member 130 upwardly to a position in which communication between chambers 126 and 133 is open via bore 135 and a counterbore 141 coaxial with the bore 135 and encircled at its upper end by the valve seat 129, and communication between chamber 133 and chamber 138 is closed, as shown in FIG. 2.

The casing section 114 is provided with a vertical bolting face 142 whereby the pilot emergency vent valve device 8 can be secured to the pipe bracket 120 by the hereinbefore-mentioned cap screws (not shown). The pipe bracket 120 can be secured to any suitable part of a locomotive or self-propelled car.

OPERATION

The present invention relates to improvements in an electro-pneumatic emergency brake control apparatus which may be used in a combined electro-pneumatic and automatic-pneumatic brake equipment for a locomotive or a self-propelled passenger car. Therefore, only a description of the operation of this brake apparatus when an emergency brake application is effected is deemed necessary to an understanding of the invention.

Assume initially that the combined electro-pneumatic and automatic-pneumatic brake equipment embodying the electro-pneumatic emergency brake control apparatus of the present invention is the brake equipment on a locomotive or a self-propelled passenger car. Also, assume that this brake equipment is fully charged and that the brakes on the locomotive or self-propelled passenger car are released.

*Manually effected electro-pneumatic emergency brake application*

To effect an electro-pneumatic emergency application of brakes, electric power is supplied from a battery 143 (FIG. 1) via a pair of wires 144 and 145 (FIG. 1) and a pair of conventional contacts (not shown) in these wires, under the manual control of the engineer, to the solenoid operated emergency magnet valve device 79.

Upon energization of the solenoid-operated emergency magnet valve device 79, shown in FIG. 1 of the drawings, in the manner just described, this magnet valve device operates to establish a communication between its supply and delivery chambers. Since the brake pipe 4 is connected to the supply chamber of the solenoid-operated emergency magnet valve device 79 via pipe and passageway 44, check valve 72 (FIG. 3), chamber 75 and passageway 43, fluid under pressure will flow now from the brake pipe 4 to this supply chamber and thence to the delivery chamber from which it flows respectively to the chamber 80 above the switch piston 80a via the passageway 48 and branch passageway 48a, and to the control chamber 117 (FIG. 2) of the pilot emergency vent valve device 8 via the passageway 48 to which one end of a branch of the pipe 21 is connected, this branch of the pipe 21, pipe T 21a and pipe 21 which is connected to one end of a passageway 146 extending through the pipe bracket 120 (FIG. 2), casing section 114, and cover 116 of the pilot emergency vent valve device 8, the opposite end of which passageway 146 opens into chamber 117.

It may be noted that the fluid under pressure supplied to the control chamber 117 of the pilot emergency vent valve device 8 may flow therefrom to atmosphere via passageway 146, pipe 21, pipe T 21a, choke 23, chamber 26 in the emergency portion 10 of the fluid pressure brake control valve device 5, and choke 20. The sizes of the two chokes 23 and 20, which are in series, so restrict the flow of fluid under pressure from the control chamber 117 (FIG. 2) and also from the chamber 80 (FIG. 3) above the piston 80a of the pneumatic switch device 81 that the fluid under pressure supplied to these chambers is effective to respectively deflect the diaphragm 115 and the piston 80a downward against the yielding resistance of the respective springs 122 (FIG. 2) and 98 (FIG. 3).

Fluid under pressure thus supplied to the control chamber 117 of the pilot emergency vent valve device 8 is effective to deflect the diaphragm 115 downward to effect seating of the valve 127 and unseating of the valve 136. The hereinbefore-mentioned pipe 36 is connected by a corresponding passageway bearing the same numeral and extending through the pipe bracket 120, and the casing sections 114, 132 and 134 to the chamber 133 in the pilot emergency vent valve device 8. Therefore, upon unseating of the valve 136, fluid at brake pipe pressure in the chamber 27 above the cylindrical valve 24 flows to atmosphere, via fluted portion 34 and peripheral annular groove 35 formed on the cylindrical valve 24, passageway and corresponding pipe 36, chamber 133, past unseated valve 136, chamber 138 and passageway 139, at a faster rate than fluid under pressure can flow from chamber 13 to the chamber 27 via passageway 28 and choke 29 therein. Therefore, the higher pressure in the chamber 13 and acting on the lower side of the brake pipe vent valve 18 within the annular valve seat 31 establishes a differential of pressure that acts upward on the brake pipe vent valve 18 and cylindrical valve 24 to move them upward so that the brake pipe vent valve 18 is unseated from the annular valve seat 31, whereupon fluid under pressure from the brake pipe 4 flows via brake pipe branch pipe and corresponding passageway 6, chamber 13, past unseated vent valve 18, chamber 26 and choke 20 to atmosphere. Fluid under pressure also flows from the chamber 26 via passageway and pipe 21 having check valve device 22 and pipe T 21a therein, and passageway 146 to the control chamber 117 in the pilot emergency vent valve device 8. The combined flow of fluid under pressure from the brake pipe 4 and active in the chamber 13 to atmosphere via the choke 20 and to the control chamber 117 via passageway and pipe 21 having check valve device 22 and pipe T 21a therein, and passageway 146, effects a reduction in the pressure in the brake pipe 4 at an emergency rate which is transmitted to the next car in the train.

The fluid under pressure supplied from the brake pipe 4 past the vent valve 18 to the control chamber 117 in the pilot emergency vent valve device 8 is therefore effective to assist the fluid under pressure supplied from the brake pipe 4 via the solenoid-operated emergency magnet valve device 79 to this control chamber 117 to maintain the valves 127 and 136, respectively seated and unseated until this fluid under pressure in the chamber 117 is reduced, by flow to atmosphere via passageway 146, pipe and passageway 21 having pipe T 21a therein, choke 23, chamber 26, and choke 20, to such a value that the spring 140 is rendered effective to seat the valve 136 on the annuular valve seat 137, thereby closing communication between chambers 133 and 138, so that fluid under pressure active in the chamber 27 above the cylindrical valve 24 of the emergency portion 10 of the fluid pressure brake control valve device 5 is no longer vented to atmosphere via fluted portion 34 and the peripheral annular groove 35 on cylindrical valve 24, passageway and pipe 36, chamber 133, past valve 136, chamber 138 and passageway 139, thereby rendering spring 30 effective through the intermediary of cylindrical valve 24 to reseat brake pipe vent valve 18 on annular seat 31.

The emergency rate of reduction of pressure in the brake pipe 4 in response to unseating of the brake pipe vent valve 18 of the emergency portion 10 of the fluid pressure brake control valve device 5, in the manner explained above, causes the brake control valve device 5 to operate, in the manner described in the above-mentioned Patent 3,018,138, to effect the supply of fluid under pressure from the auxiliary reservoir 1 (FIG. 1) to a passageway and corresponding pipe 147 (FIG. 2) which is connected to the left-hand end of a pipe T 148 (FIGS. 1 and 3), the side outlet of which is connected by a pipe 149 to the left-hand end of the hereinbefore-mentioned double check valve device 51, the side outlet of which is connected through certain devices that form no part of the present invention to a relay device (not shown) which operates in response to fluid under pressure supplied thereto to effect a corresponding supply of fluid under pressure to a brake cylinder device (not shown) to cause an emergency brake application on the locomotive or self-propelled passenger car.

It should be understood that the chokes 23 and 20, in series, through which the fluid under pressure supplied to the chamber 117 is vented therefrom, are of such size as to insure that the valve 136 of the pilot emergency valve device 8 is held open long enough to cause operation of the fluid pressure brake control valve device 5 to effect an automatic-pneumatic emergency brake application.

The wire 145 (FIG. 1) is connected by a wire 150 to a wire 151 that extends from end to end of the locomotive or self-propelled passenger car and is connected or coupled to a corresponding wire on the adjacent car, it being understood that each car in the train is provided with such a wire that is connected to each adjacent car and to one terminal of a solenoid-operated emergency magnet valve device that corresponds to the solenoid-operated emergency magnet device 79. Furthermore, the other terminal of these solenoid-operated emergency magnet valve devices is connected to a wire that extends from car to car through the train and is connected to a wire 152 that extends from end to end of the locomotive or self-propelled passenger car from which the brakes are controlled. The wire 152 is connected, as shown in FIG. 1, via a wire 163 and the wire 144 to the negative terminal of the battery 143. Therefore, the solenoid-operated emergency magnet valve device on each car in the train corresponding to the solenoid-operated emergency magnet valve device 79 on the locomotive or leading self-propelled car is energized simultaneously as the emergency magnet valve device 79 is energized to cause the brake equipment on each car in the train to effect an electro-pneumatic emergency brake application of the brakes on the respective car.

After the train has been brought to a stop and the danger no longer exists, the brakes on the train may be released by the engineer manually cutting off the supply of power from the battery 143 to the solenoid-operated emergency magnet valve device 79, shown in FIG. 1, and the corresponding solenoid-operated emergency magnet valve devices on the other cars in the train. When the solenoid-operated emergency magnet valve device 79 and each corresponding solenoid-operated emergency magnet valve device is thus deenergized, communication is closed between the supply and delivery chambers thereof so that communication between the brake pipe 4 and the chambers 80 (FIG. 3) and 117 (FIG. 2) is closed. The brake pipe 4 can now be recharged in the usual manner, whereupon the fluid pressure brake control valve device 5 and the corresponding brake control valve devices on each car in the train operate in response to charging of the brake pipe to release the brakes on the respective car.

The supply of fluid under pressure to the chamber 80 of the pneumatic switch device 81 upon energization of the solenoid-operated emergency magnet valve device 79 in response to a manually effected electro-pneumatic emergency brake application is without effect, since the solenoid-operated emergency magnet valve device 79 is energized in the manner hereinbefore explained.

*Conductor's valve emergency brake application*

As is the usual practice, the combined electro-pneumatic and automatic-pneumatic brake equipment embodying the present invention is provided with a conventional conductor's valve device (not shown), the manual operation of which causes a reduction of the pressure in the brake pipe 4 at an emergency rate.

If, when the brakes on the train are released, the conductor desires to bring the train to a stop, he will manually operate the conductor's valve device to cause fluid under pressure to be vented from the brake pipe 4 to atmosphere at an emergency rate.

The brake control valve device 5 will now operate in response to this emergency rate of reduction of pressure in the brake pipe 4, in the manner described in Patent 3,018,138, to cause an automatic-pnuematic emergency application of the brakes on the locomotive or self-propelled passenger car that is the leading car in the train.

The emergency portion 10 of the brake control valve device 5 operates in the manner hereinbefore described to effect the supply of fluid under pressure from the brake pipe 4 to the diaphragm chamber 117 of the pilot emergency brake valve device 8 to cause it to operate in the manner hereinbefore described. However, the emergency portion 10 of the brake control valve device 5 has already operated to effect unseating of the brake pipe vent valve 18 (FIG. 2). Therefore, the operation of the pilot emergency vent valve device 8 is without effect.

The fluid under presure supplied from the brake pipe 4 to the chamber 117 of the pilot emergency vent valve device 8 also flows via the right-hand side outlet of the pipe T 21a (FIG. 2), pipe 21, passageway 48 (FIG. 3), and branch passageway 48a to the chamber 80 above the piston 80a of the pneumatic switch device 81. Fluid under presure thus supplied to the chamber 80 is effective to move the piston 80a, piston rod 88, and the rod 92 carried thereby downward against the yielding resistance of the spring 98 to bring the contact 93, yieldingly biased by the contact spring 95 against the nut 94 secured to the rod 92, into contact with the switch terminals 96 and 97 of the pneumatic switch device 81.

The switch terminal 96 is connected by a wire 154 to a wire 155 (FIG. 1) that extends from end to end of the locomotive or self-propelled passenger car and is connected or coupled to a corresponding wire on an adjacent car, it being understood that each car in the train is provided with such a wire that is connected to each adjacent car and to one end of a pneumatic switch device corresponding to the pneumatic switch device 81.

As shown in FIG. 1, the wire 155 on the locomotive or self-propelled passenger car is connected by a wire 156 to one terminal of a switch device 157 that is manually closed by the engineer when he takes control of the locomotive or self-propelled passenger car to begin a run from one terminus to another. The other terminal of the switch device 157 is connected by a wire 158 to the positive terminal of the battery 143.

Therefore, when the contact 93 (FIG. 3) of the pneumatic switch device 81 is moved into contact with the switch terminals 96 and 97, a circuit is closed to effect energization of the solenoid-operated emergency magnet valve device 79 (FIG. 1). This circuit extends from the positive terminal of the battery 143 (FIG. 1) via wire 158, switch device 157, wires 156, 155 and 154, switch terminal 96 (FIG. 3), contact 93, switch terminal 97, a wire 159 that connects switch terminal 97 to the wire 145 (FIG. 1), and wire 145 to one terminal of the solenoid-operated emergency magnet valve device 79, thence through the coil of the solenoid of this magnet valve device to the other terminal thereof, and the return wire 144 to the negative terminal of the battery 143.

When the solenoid-operated emergency magnet valve device 79 is thus energized via the above-described circuit, it operates in the manner hereinbefore described, but this operation is without effect since the brake control valve device 5 has already operated to effect an automatic-pnuematic emergency brake application on the locomotive or self-propelled leading car in the train. However, since the wire 145 is connected to the wire 151 by the wire 150, the above-described operation of the pneumatic switch device 81 establishes a circuit for energizing the solenoid-operated emergency magnet valve devices on the other cars in the train corresponding to the solenoid-operated emergency magnet valve device 79. This circuit extends from the positive terminal of the battery 143 via wire 158, switch device 157, wires 156, 155 and 154, switch terminal 96 (FIG. 3), contact 93, switch terminal 97, wires 159 and 150 to the wire 151 that is connected to a corresponding wire on the adjacent car, which wire extends from car to car through the train, thence to one terminal of the solenoid-operated emergency magnet valve device, through the coil of each respective solenoid-operated emergency magnet valve device to the other terminal thereof, which other terminal is connected to another wire that extends from car to car through the train and is connected to the wire 152 that, in turn, is connected via the wire 153 and wire 144 to the negative terminal of the battery 143.

Therefore, the solenoid-operated emergency magnet valve device on each car in the train corresponding to the solenoid-operated emergency magnet valve device 79 is energized through the circuit traced above and operates in response to this energization, in the manner hereinbefore described, for the solenoid-operated magnet valve device 79 to cause an electro-pneumatic emergency application of the brakes on each respective car in the train to occur simultaneously and prior to the operation of the brake control valve device on each respective car that would occur in response to the reduction in the pressure in the brake pipe at an emergency rate to effect an automatic-pneumatic emergency brake application.

After the train has been brought to a stop, the conductor will operate the conductor's valve device to its closed position to cut off communication between the brake pipe 4 and atmosphere. Fluid under pressure now supplied to the brake pipe 4 by an engineer's brake valve device (not shown) will flow via branch pipe 6 to the brake control valve device 5 to operate this brake control valve device to effect a release of the brakes on the locomotive or self-propelled passenger car that is the leading car in the train.

When the emergency portion 10 (FIG. 2) of the brake control valve device 5 is in its release position, the brake pipe vent valve 18 will be seated on the annular valve seat 31 by the spring 30 acting through the intermediary of the cylindrical valve 24. Thus, communication is closed between the chambers 13 and 26, and the chamber 13 is recharged to the normal pressure carried in the brake pipe 4. Therefore, upon reseating of the brake pipe vent valve 18 on the annular valve seat 31, fluid under pressure will be vented from chamber 80 (FIG. 3) of the pneumatic switch device 81 to atmosphere via branch passageway 48a, passageway 48, pipe 21 having therein the pipe T 21a and the choke 23 (FIGS. 1 and 2), chamber 26, and choke 20. As fluid under pressure is thus vented from the chamber 80 (FIG. 3), the spring 98 is rendered effective to return the piston 80a, piston rod 88, rod 92 and contact 93 to the position shown in FIG. 3, in which position the contact 93 is out of contact with the switch terminals 96 and 97 to thereby open the hereinbefore-traced circuit to the solenoid-operated magnet valve device 79 and the corresponding solenoid-operated magnet valve devices on the other cars in the train.

When the solenoid-operated emergency magnet valve device 79 is thus deenergized, communication is closed between its supply and delivery chambers so that fluid under pressure supplied from the brake pipe 4 to its delivery chamber will be retained therein. The solenoid-operated magnet valve devices on the other cars in the train corresponding to the solenoid-operated magnet valve device 79 operated in the same manner as the solenoid-operated emergency magnet valve device 79. Likewise, the brake control valves on the other cars operate in response to charging of the brake pipe 4 to release the brakes on these cars.

Having now described the invention, what I claim as new and desire to secure by Letters Patent, is:

1. In an electro-pneumatic emergency brake control apparatus, in combination:
  (a) a brake pipe charged to a certain normal pressure,
  (b) an auxiliary reservoir charged to said certain normal pressure,
  (c) an automatic brake control valve device operable responsively to reduction of the pressure in said brake pipe at a service rate from said certain normal pressure to effect the supply of fluid under pressure from said auxiliary reservoir to cause a service brake application and responsively to reduction of the pressure in said brake pipe at an emergency rate from said certain normal pressure to cause an emergency brake application, said automatic brake control valve device comprising:
    (i) an annular valve seat,
    (ii) a piston valve having chambers at opposite ends thereof,
    (iii) biasing means disposed at one end of said piston valve for normally biasing said piston valve into seating contact with said annular valve seat to close communication past said valve seat between said brake pipe and atmosphere, and
    (iv) restricted conduit means connecting said chambers at said one end and at the other end of said piston valve whereby said one end and the other end thereof are normally subject to the pressure in said brake pipe,
  (d) unrestricted conduit means through which the chamber at said one end of said piston valve can be vented to atmosphere to render said restricted conduit means effective to establish a differential fluid pressure force on said piston valve to cause shifting thereof away from said annular valve seat against the yielding resistance of said biasing means to an unseated position in which it establishes a communication through which fluid under pressure is vented from said brake pipe at an emergency rate to cause said automatic brake control valve device to operate to effect an emergency brake application, and (e) manually controlled electro-responsive means operative to cause fluid under pressure to be vented from the chamber at said one end of said piston valve to atmosphere via said unrestricted conduit means.

2. In an electro-pneumatic emergency brake control apparatus, in combination:

(a) a brake pipe charged to a certain normal pressure, (b) an auxiliary reservoir charged to said certain normal pressure, (c) a fluid pressure operated pilot emergency vent valve device, (d) an automatic brake control valve device operable responsively to reduction of the pressure in said brake pipe at a service rate from the certain normal pressure to effect the supply of fluid under pressure from said auxiliary reservoir to cause a service brake application and responsively to reduction of the pressure in said brake pipe at an emergency rate from said certain normal pressure to cause an emergency brake application, said automatic brake control valve device comprising:

(i) an annular valve seat,
(ii) a piston valve having chambers at opposite ends thereof,
(iii) biasing means disposed at one end of said piston valve for normally biasing said piston valve into seating contact with said annular valve seat to close communication past said valve seat between said brake pipe and atmosphere, and
(iv) restricted conduit means connecting said chambers at said one end and at the other end of said piston valve whereby said one end and the other end thereof are normally subject to the pressure in said brake pipe, (e) unrestricted conduit means connecting the chamber at said one end of said piston valve to said fluid pressure operated pilot emergency vent valve device, (f) manually controlled electro-responsive valve means for effecting the supply of fluid under pressure from said brake pipe to said fluid pressure operated pilot emergency vent valve device to cause the operation thereof to effect unrestricted venting of fluid under pressure from the chamber at said one end of said piston valve of said automatic brake control valve device to atmosphere via said unrestricted conduit means thereby to render said restricted conduit means effective to establish a differential fluid pressure force on said piston valve to cause shifting thereof away from said annular valve seat against the yielding resistance of said biasing means to an unseated position to establish a communication through which fluid under pressure is vented from said brake pipe at an emergency rate to cause said automatic brake control valve device to operate to effect an emergency brake application, (g) conduit means through which fluid under pressure vented from said brake pipe at an emergency rate by operation of said piston valve is supplied to said fluid pressure operated pilot emergency vent valve device to assist the fluid under pressure supplied thereto by said manually controlled electro-responsive valve means in effecting the operation thereof, and (h) choke means through which fluid under pressure supplied to said fluid pressure operated pilot emergency vent valve device is vented to atmosphere at a controlled rate to render said fluid pressure operated pilot emergency vent valve device effective to terminate, after a chosen time, said unrestricted venting of fluid under pressure from the chamber at said one end of said piston valve thereby rendering said biasing means effective to seat said piston valve on said annular valve seat with the result that the venting of fluid under pressure from said brake pipe at an emergency rate is terminated after a corresponding chosen time.

3. An electro-pneumatic emergency brake control apparatus, as claimed in claim 1, further characterized in that said automatic brake control valve device further comprises:

(a) a quick action chamber charged to said certain normal pressure,
(b) a movable abutment subject opposingly to brake pipe pressure and quick action chamber pressure,
(c) a stem connected to said movable abutment and interposed between said abutment and said piston valve, and
(d) choke means controlling the rate of venting fluid under pressure from said quick action chamber to atmosphere thereby rendering said stem effective to prevent reseating of said piston valve by said biasing means until quick action chamber pressure effective on one side of said movable abutment is reduced by flow through said choke means to atmosphere to a pressure that exceeds brake pipe pressure effective on the opposite side of said abutment by a chosen amount thereby insuring that said biasing means is ineffective to move said piston valve into contact with said annular valve seat so long as the pressure in said quick action chamber exceeds the pressure in said brake pipe by more than said chosen amount.

4. An electro-pneumatic emergency brake control apparatus, as claimed in claim 2, further characterized by a check valve device disposed in said conduit means for providing a rapid rate of flow of fluid under pressure vented from the brake pipe by said piston valve to said fluid pressure operated pilot emergency valve device, and a choke connected in bypass of said check valve device to insure a restricted rate of flow of fluid under pressure reversely through said conduit means from said fluid pressure operated pilot emergency valve device to atmosphere.

No references cited.

EUGENE G. BOTZ, *Primary Examiner.*